United States Patent [19]
Rice

[11] 3,713,161
[45] Jan. 23, 1973

[54] AIRCRAFT PROXIMITY WARNING INDICATOR

[75] Inventor: Elmore W. Rice, Indianapolis, Ind.

[73] Assignee: General Aviator Electronics, Inc., Indianapolis, Ind.

[22] Filed: Aug. 25, 1970

[21] Appl. No.: 66,684

[52] U.S. Cl. ..........................343/112 CA, 343/6.5 R
[51] Int. Cl. ............................C08g 5/04, G01s 9/56
[58] Field of Search ...............................343/112 CA

[56] References Cited

UNITED STATES PATENTS 3,626,411  12/1971  Litchford ...................343/112 CA X
3,550,129  12/1970  Steele .........................343/112 CA

*Primary Examiner*—T. H. Tubbesing
*Attorney*—Woodward, Weikart, Emhardt & Naughton

[57] ABSTRACT

An apparatus carried aboard an aircraft to indicate the proximity of intruding aircraft equipped with transmitting air traffic control transponders. A receiver acquires the transponder signal of the intruding aircraft and relays the signal to a decoder circuit. A gating circuit within the decoder circuit opens to allow the transponder signal to pass to a pulse width discriminator which excludes all signals not having the unique pulse width of a transponder signal. A generator provides a pulse for simultaneously operating the gating circuit and suppressing the transponder and distance measuring equipment carried abroad the aircraft equipped with the proximity indicator. A time delay circuit and a coincidence circuit are connected to the pulse width discriminator and allow only signals to pass to a warning generator which have the unique time period of a transponder signal. Visual and audio indicators are connected to the warning generator for indicating the receipt by the warning generator of an air traffic control transponder signal.

15 Claims, 4 Drawing Figures

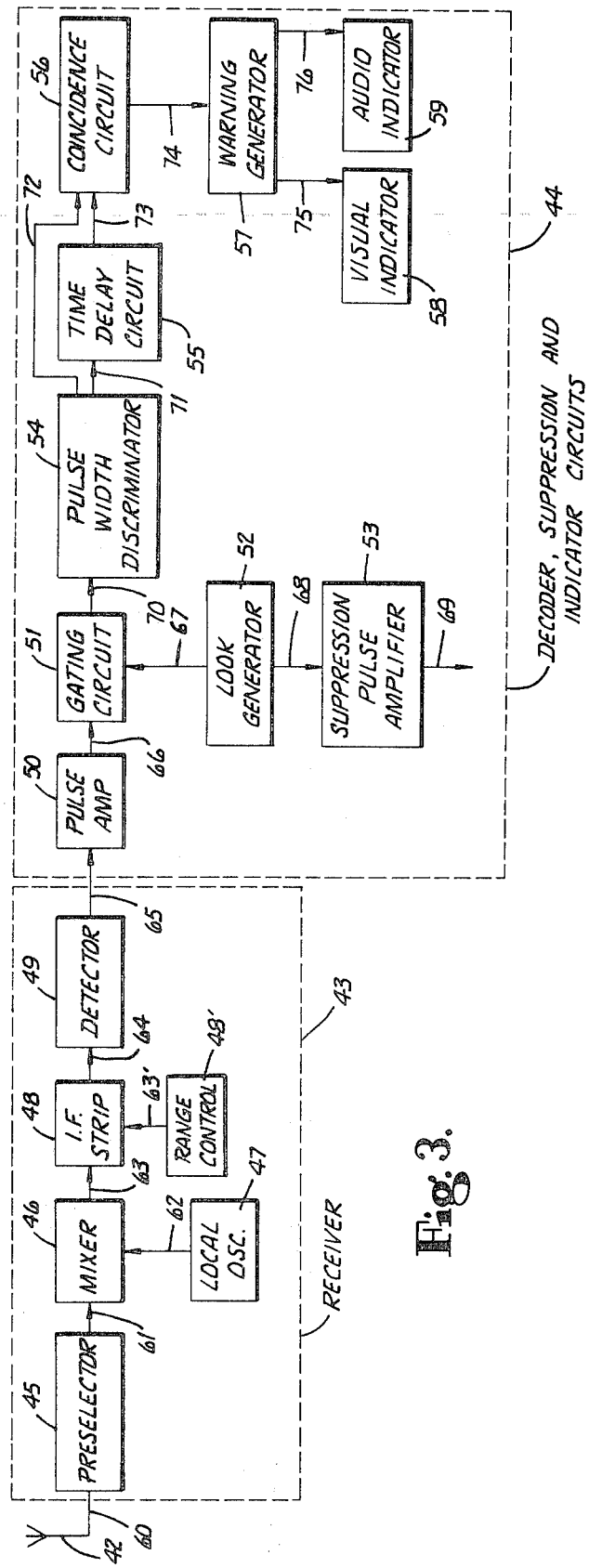
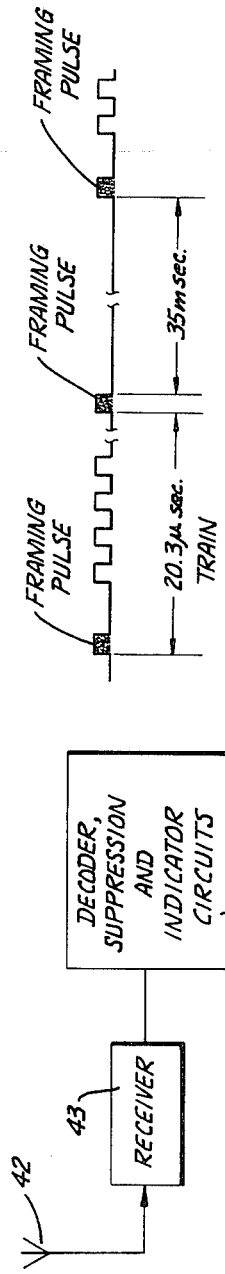

3,713,161

AIRCRAFT PROXIMITY WARNING INDICATOR

DESCRIPTION OF THE PRIOR ART

1. Field of the Invention

This invention is a receiving and indicating apparatus for determining the proximity of aircraft.

2. Description of the Prior Art

Due to the rising number of aircraft in congested areas, efforts have been made to develop a system which will warn a pilot of other aircraft in his proximity thereby allowing action to avoid collisions and near misses. More specifically, a need has been demonstrated for a proximity warning indicator system that will detect the presence of another aircraft within a one to three mile range and provide the pilot with a warning of the proximity of this aircraft. Many approaches to the solution of this problem have failed because of the necessity for expensive cooperative systems.

The Federally administered air traffic control system assists the ground controller in identification of aircraft equipped with air traffic control transponders. An interrogation from the aircraft control center is directed towards the aircraft transponder which replies giving the altitude and/or identity of the aircraft. In addition, several devices are available to locate an aircraft by distance measuring equipment. Some of these devices are shown in the following U.S. Pats.: 3,239,834 to Lucchi, 3,324,467 to Crow, 3,302,199 to Kelly et al., 3,246,325 to Sofen et al., 3,400,398 to Lapeyre et al. and 3,253,278 to Lucchi. In spite of the above described problem, a system has not been devised to provide a pilot with a direct automatic warning when another aircraft is in his proximity.

The present invention provides a solution to these problems by providing a proximity warning indicator for placing aboard a first aircraft to warn the pilot of the proximity of aircraft transmitting the transponder reply signal. The proximity warning indicator is relatively inexpensive and high effective in the high density congested terminal areas where collision is always an imminent threat. The proximity warning indicator temporarily suppresses all equipment aboard the first aircraft which transmits signals identical or similar to the transponder reply signal of an intruding aircraft. As a result, the proximity warning indicator is very reliable since false warnings which could result from the reception of signals transmitted by the first aircraft are precluded. The proximity warning indicator recognizes the unique signature of the air traffic control transponder replay signal.

SUMMARY OF THE INVENTION

This invention is a proximity warning indicator to be carried on a first aircraft to indicate the proximity of aircraft equipped with transmitting air traffic control transponders. A receiver acquires the transponder signal of the intruding aircraft and provides the signal to a pulse amplifier for amplification. The signal then passes through a gating circuit to a pulse width discriminator. The discriminator excludes all signals not having the characteristic pulse width of a transponder reply signal. A time delay circuit and a coincidence circuit are connected to the pulse width discriminator and recognize only signals having the characteristic time period of a transponder reply signal. A warning generator is connected to the coincidence circuit for relaying the received transponder replay signal to visual and audio indicators. A generator provides a pulse for simultaneously operating the gating circuit and for suppressing equipment carried by the first aircraft transmitting signals identical or similar to transponder reply signals.

It is an object of the present invention to provide a device for placing on a first aircraft for indicating the proximity of other aircraft transmitting a transponder reply signal. It is another object of the present invention to provide a proximity warning indicator for a first aircraft to indicate the proximity of other aircraft transmitting a transponder signal and which doesn't give a false indication as a result of signals transmitted by the first aircraft.

Yet another object of the present invention is to provide a proximity warning indicator in accordance with the above objects which will recognize the unique signature of an air traffic control transponder reply signal.

Still another object of the present invention is to provide an inexpensive proximity warning indicator to be carried on a first aircraft having suppression circuits temporarily blanking out the air traffic control transponder and distance measuring equipment carried aboard the first aircraft.

Related objects and advantages of the present invention will be apparent from the following description.

BRIEF DESCRIPTION OF THE DRAWING

FIG. 2 is a general block diagram of a proximity warning indicator.

FIG. 3 is a detailed block diagram of a proximity warning indicator.

FIG. 4 is a wave form illustrative of the signals transmitted by the Air Traffic Control center and by the associated air-borne transponders.

DESCRIPTION OF THE PREFERRED EMBODIMENT

Figure 1:
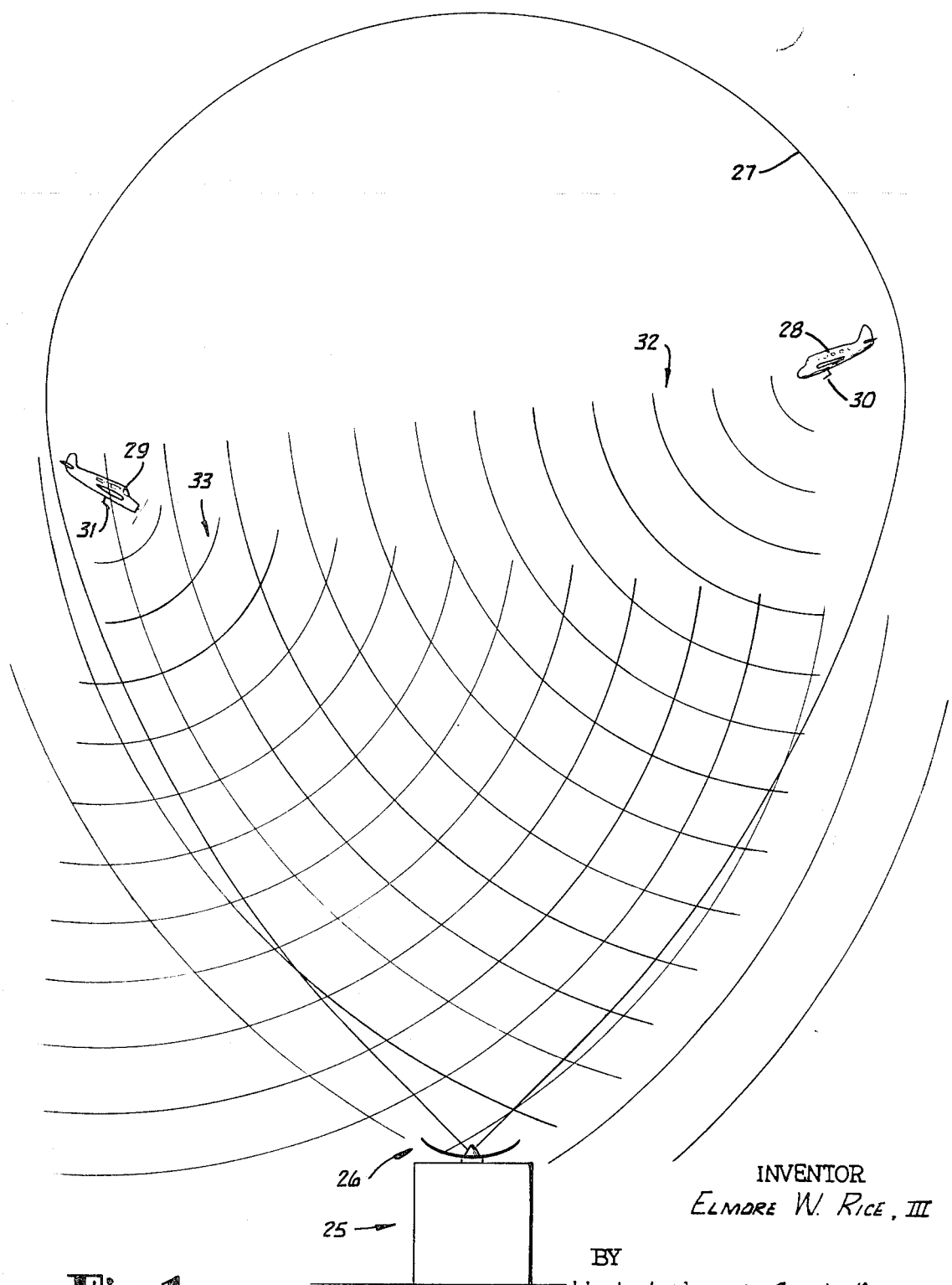
FIG. 1 is an illustration of an Air Traffic Control center emitting interrogation signals to two transponder equipped aircraft, one of which is also equipped with a proximity warning indicator incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is illustrated a ground based Air Traffic Control (ATC) center 25 with an antenna 26 transmitting a signal 27 for interrogating air-borne transponders. The ATC centers are utilized for acquiring the altitude and/or identification of ATC transponder equipped aircraft within the range of antenna 26. Aircraft 29 and 28 are both equipped with ATC transponders and are shown transmitting respectively signals 33 and 32 through antennas 31 and 30 in response to interrogation signal 27. Aircraft 29 is also equipped with a Proximity Warning Indicator which is the present invention. The Proximity Warning Indicator is operable when aircraft 29 is within the pattern of transponder signal 32 transmitted by intruding aircraft 28. Although aircraft 29 is also shown within the pattern of signal 27, the Proximity Warning Indicator is also operable outside the pattern of signal 27.

Signal 27 transmitted by the ATC center 25 has a frequency of 1,030 MHZ whereas the transponder reply signals 32 and 33 have a frequency of 1,090 MHZ. A train of pulses is carried on the 1,030 MHZ and 1,090 MHZ signals. The train always includes two framing pulses spaced 20.3 micro seconds apart with one train being separated from the following train by 35 milliseconds. Each framing pulse is approximately 0.45 microseconds wide. Pulses between the two framing pulses contain coded information relative to the altitude and identification of the aircraft. These transponders and ATC centers are quite well known in the art and therefore additional description in this specification would be superfluous.

FIG. 2 is a general block diagram of the Proximity Warning Indicator carried on aircraft 29. Antenna system 42 is mounted to aircraft 29 for receiving the 1,090 MHZ pulsed signal from the Air Traffic Control transponder on intruding aircraft 28. Antenna system 42 has omni directional characteristics, such as presently employed on an aircraft traffic control transponder antenna. Antenna system 42 may additionally have a directional array to provide additional warning range in a specified direction. The directional array is mounted to the front of the aircraft to look for intruding aircraft ahead in the flight path.

The various signals received by antenna system 42 are fed to receiver 43 which is tuned to 1,090 MHZ. Receiver 43 in turn feeds the 1,090 MHZ signals to the decoder, suppression and indicator circuits 44 wherein the signal is processed for indicating the proximity of the intruding aircraft. Receiver 43 may be any conventional receiver design including crystal video receivers and super hetrodyne receivers with a sensitivity for receiving a transponder signal over a range of at least 3 miles.

A more detailed block diagram of the Proximity Warning Indicator is illustrated in FIG. 3 with receiver 43 having subassemblies indicated by blocks 45 through 49. The signals received by antenna 42 are fed to preselector 45 via a coaxial cable 60. Preselector 45 is a fixed tuned three pole band pass filter for selecting 1,090 MHZ signals and for excluding all other signals. Positive and negative 1,090 MHZ pulses of radiation flow out of preselector 45 and through wire 61 to mixer 46 where they are combined with a signal provided by local oscillator 47 through wire 62 to mixer 46. The combination of the 1,090 MHZ signal with the local oscillator signal produces a signal having an intermediate frequency (I.F.) which is provided through wire 63 to I.F. strip 48. The I.F. signal is then amplified by I.F. strip 48 which is connected by wire 64 to detector 49. The detector pulse signal is then routed through wire 65 to the decoder, suppression and indicator circuits 44. Range control 48' is connected to I.F. strip 48 by wire 63'. Control 48' provides a sensitivity adjustment which may be set to a high or low range setting. In the high setting, receiver 43 acquires signals transmitted, for example three miles distant. In the low setting, signals are acquired which are transmitted, for example a maximum distance of 1 mile. Thus, the user may be able to determine the general distance between his aircraft and the intruding aircraft by switching the range control from the high setting to the low setting. In areas highly congested with aircraft, control 48' is set to the low range setting to selectively acquire signals from aircraft just in the immediate area surrounding the aircraft.

Many variations of receiver 43 are possible to accomplish the desired result. For example, in one embodiment a 1,030 MHZ sine wave oscillator is used as local oscillator 47 combining with the 1,090 MHZ input signal to mixer 46. A four stage broad band I.F. strip 48 amplifies the difference between the 1,090 MHZ and 1,030 MHZ signals with the resulting output of 60 MHZ having little pulse distortion. Detector 49 accepts the 60 MHZ signal allowing the negative going portion of the 60 MHZ signal to pass to the decoder, suppression and indicator circuits 44.

Circuits 44 decode the output signals from receiver 43 in order to recognize the unique signature of an ATC transponder reply signal. In addition, circuits 44 generate a blanking pulse for suppression of the on board ATC transponder and Distance Measuring Equipment (DME) transmitters which have output signals identical or similar in nature to that of the ATC transponder carried aboard the intruding aircraft. Of course, other systems which generate interferring signals, such as on board radars, would also be blanked out. It is extremely difficult to distinguish between a close-by ATC transponder reply signal transmitted by an intruding aircraft and transponder reply signals transmitted by the aircraft equipped with the Proximity Warning Indicator. Thus, the on board ATC transponder as well as the on board DME equipment must be temporarily blanked out during the operation of the Proximity Warning Indicator. Circuits 44 also provide an indication of the reception of the transponder reply signal and thereby indicate that an intruding aircraft is in the vicinity.

Pulse amplifier 50 receives the detected pulse signal from receiver 43 via wire 65 and amplifies the pulse before sending the signal via wire 66 to gating circuit 51. Look generator 52 has a free running random oscillator for operating the gate of gating circuit 51 and for blanking out or suppressing the on board transponder and DME equipment via suppression pulse amplifier 53. Of course, if the aircraft equipped with the Proximity Warning Indicator is not also equipped with a transponder and/or a DME system then amplifier 53 will not be required. Nevertheless, generator 52 may still be utilized for operating gating circuit 51. Prior to the present invention, DME and ATC transponders have been inter-connected for suppression purposes thereby avoiding interference between the two systems. As a result, input jacks are provided on DME units and ATC transponders currently in use for receiving wire 69 of suppression pulse amplifier 53. Look generator 52 provides a 3.5 millisecond blanking pulse every 20.8 milliseconds through wire 68 to amplifier 53 where it is amplified and routed to the on board DME and ATC systems through wires 69. The on board ATC transponder will be temporarily blanked or suppressed for a maximum time it takes to receive two framing pulses from the ATC center. The framing pulses are approximately 0.45 microseconds wide. The second framing pulse will follow the start of the first framing pulse no sooner than 20.3 microseconds with the next train occurring 35 milliseconds later (FIG. 4). Thus, only a maximum of two framing pulses will be missed by the on board ATC transponder during the 3.5 millisecond suppression.

Look generator 52 is energized at all times when airborne and is continuously generating the 3.5 millisecond signal every 20.8 milliseconds. The 20.8 millisecond sampling rate varies slightly in order to insure that two aircraft both equipped with Proximity Warning Indicators do not simultaneously suppress their own transponders thereby rendering the Proximity Warning Indicators ineffective relative to each other. Look generator 52 simultaneously provides the 3.5 millisecond pulse via wire 67 to gating circuit 51 thereby allowing all signals present at the output of pulse amplifier 50 to pass through for the 3.5 milliseconds the gate is opened. Since the ATC transponder signal from the intruding aircraft is composed of trains 20.3 microseconds in length separated by 35 milliseconds, only a maximum of two framing pulses will normally pass through gate 51 at any one time. More than two framing pulses may pass through gate 51 at the same time in the event that there are two or more intruding aircraft transmitting the transponder signal in the proximity of the aircraft carrying the Proximity Warning Indicator.

Pulse width discriminator 54 receives the signals passing through gating circuit 51 via wire 70 and compares the width of the signals with a mono-stable, multi-vibrator signal thereby excluding signals which do not meet the proper width characteristic. Only signals having the proper width may pass through discriminator 54. The ATC pulses are distorted and stretched slightly as a result of the various processing circuits. Thus, discriminator 54 should be set to pass signals through having pulses slightly greater than 0.45 microseconds, depending upon the distortion resulting from the processing circuits.

The output of discriminator 54 is applied to coincidence circuit 56 via wire 72 and to time delay circuit 55 via wire 71. Time delay circuit 55 has two mono-stable, multi-vibrators. The first multi-vibrator starts to count a specified length of time, for example 19.8 microseconds, after it receives an output signal from discriminator 54. Immediately, after the specified length of time has elapsed a second multi-vibrator applies a signal, for example 1 microsecond in length, via wire 73 to coincidence circuit 56. Simultaneously, the output signal from discriminator 54 is applied via wire 72 to coincidence circuit 56 so that the second framing pulse is fed to circuit 56 during the time circuit 56 is also receiving the output signal from wire 73. A signal is applied to warning generator 57 via wire 74 only when the coincidence circuit 56 simultaneously receives the second framing pulse from wire 72 and the second multi-vibrator output signal from wire 73. Generator 57 is connected by wire 75 to a suitable visual indicator 58, such as a light and by wire 76 to a suitable audio indicator 59, such as a horn. Thus, the pilot is warned, that a signal has been received from an ATC transponder equipped intruding aircraft.

It will be evident from the above description that the present invention provides a device for placing aboard a first aircraft to indicate the proximity of other aircraft equipped with transmitting transponders. It will be further evident from the above description that the present invention provides a Proximity Warning Indicator which will not give a false warning as a result of operation of other electronic equipment carried aboard the first aircraft. It will also be evident from the above description that the above described Proximity Warning Indicator recognizes the unique signature of air traffic control transponder reply signals transmitted by other aircraft. In addition, it will be evident from the above description that the above described Proximity Warning Indicator has a suppression circuit for temporarily blanking out air traffic control transponder signals and distance measuring equipment signals transmitted by the first aircraft.

While the invention has been disclosed and described in detail in the drawings and foregoing description, they are to be considered as illustrative and not restrictive in character, as other modifications may readily suggest themselves to persons skilled in this art.

The invention claimed is:

1. A proximity warning indicator to be placed on a first aircraft for indicating the proximity of transponder equipped aircraft comprising:
    a decoder circuit recognizing signals transmitted by said transponder equipped aircraft;
    an indicator circuit connected to said decoder circuit and activated by said decoder circuit upon said decoder circuit recognizing said signals transmitted by said transponder equipped aircraft;
    a suppression circuit connected to said decoder circuit, said suppression circuit temporarily blanking out signals transmitted by devices on said first aircraft, said decoder circuit operating during said blanking.

2. The proximity warning indicator of claim 1 additionally comprising:
    a receiver tuned to receive said signals transmitted by said transponder equipped aircraft, said receiver being connected to said decoder circuit and conveying said signals transmitted by said transponder equipped aircraft to said decoder circuit.

3. The proximity warning indicator of claim 1 wherein:
    said decoder circuit has a gating circuit, a pulse width discriminator circuit, a time delay circuit and a coincidence circuit,
    said gating circuit is connected to said discriminator circuit, said gating circuit opens for a discrete time duration allowing a portion of said signal transmitted by said transponder equipped aircraft to pass to said discriminator circuit,
    said discriminator circuit is connected to said delay circuit and to said coincidence circuit, said discriminator circuit allows only signal pulses of a predetermined width from said gating circuit to pass through to said coincidence circuit and said time delay circuit, said time delay circuit is connected to said coincidence circuit, said coincidence circuit has an output signal only when said discriminator circuit and said delay circuit provides simultaneous inputs to said coincidence circuit.

4. The proximity warning indicator of claim 3 wherein:

said suppression circuit has a generator connected to said gating circuit, said generator provides a pulse simultaneous to said gating circuit and to said devices on said first aircraft.

5. The proximity warning indicator of claim 4 additionally comprising:

a warning indicator circuit connected to said coincidence circuit, said indicator circuit provides an indication upon receipt of said output signal of said coincidence circuit.

6. The proximity warning indicator of claim 5 additionally comprising:

a receiver tuned to receive said signals transmitted by said transponder equipped aircraft;

a pulse amplifier connected between said receiver and said gating circuit.

7. The proximity warning indicator of claim 6 wherein:

said receiver has a preselector, a mixer, a local oscillator, an I.F. strip and a detector connected together.

8. The proximity warning indicator of claim 6 wherein:

said receiver has an adjustable range control.

9. A proximity warning indicator to be placed on a first aircraft for indicating the proximity of transponder equipped aircraft comprising:

a decoder circuit recognizing signals transmitted by said transponder equipped aircraft;

an indicator circuit connected to said decoder circuit and activated by said decoder circuit upon said decoder circuit recognizing said signals transmitted by said transponder equipped aircraft; and wherein:

said decoder circuit has a gating circuit, a pulse width discriminator circuit, a time delay circuit and a coincidence circuit;

said gating circuit is connected to said discriminator circuit, said gating circuit opens for a discrete time duration allowing a portion of said signal transmitted by said transponder equipped aircraft to pass to said discriminator circuit;

said discriminator circuit is connected to said delay circuit and to said coincidence circuit, said discriminator circuit allows only signal pulses of a predetermined width from said gating circuit to pass through to said coincidence circuit and said time delay circuit;

said time delay circuit is connected to said coincidence circuit;

said coincidence circuit has an output signal only when said discriminator circuit and said delay circuit provides simultaneous inputs to said coincidence circuit.

10. The proximity warning indicator of claim 9 wherein:

said decoder circuit has a continuously running generator connected to said gating circuit, said generator provides a series of pulses to said gating circuit for the continual opening and closing thereof.

11. A proximity warning indicator to be placed on a first aircraft for indicating the proximity of transponder equipped aircraft comprising:

a decoder circuit recognizing signals transmitted by said transponder equipped aircraft in response to a ground originating interrogation command received by said transponder equipped aircraft, said decoder circuit including a gate and a continuously running generator operably connected together with said generator supplying a continuous series of gate signals each of which is of the same duration, said gate being open during each of said gate signals and closed between gate signals; and, an indicator circuit connected to said decoder circuit and activated by said decoder circuit upon said decoder circuit recognizing said signals transmitted by said transponder equipped aircraft.

12. The proximity warning indicator of claim 11 additionally comprising:

a suppression circuit connected to said decoder circuit, said suppression circuit temporarily blanking out signals transmitted by devices on said first aircraft, said decoder circuit operating during said blanking.

13. The proximity warning indicator of claim 11 additionally comprising:

a receiver tuned to receive said signals transmitted by said transponder equipped aircraft, said receiver being connected to said decoder circuit and conveying said signals transmitted by said transponder equipped aircraft to said decoder circuit.

14. The proximity warning indicator of claim 11 wherein:

said decoder circuit includes a pulse width discriminator circuit, a time delay circuit and a coincidence circuit, said gate is connected to said discriminator circuit and opens for a discrete time duration allowing a portion of said signal transmitted by said transponder equipped aircraft to pass to said discriminator circuit, said discriminator circuit is connected to said delay circuit and to said coincidence circuit, said discriminator circuit allows only signal pulses of a predetermined width from said gate to pass through to said coincidence circuit and said time delay circuit, said time delay circuit is connected to said coincidence circuit, said coincidence circuit has an output signal only when said discriminator circuit and said delay circuit provides simultaneous inputs to said coincidence circuit.

15. The proximity warning indicator of claim 14 additionally comprising:

a warning indicator circuit connected to said coincidence circuit, said indicator circuit provides an indication upon receipt of said output signal of said coincidence circuit.

* * * * *